(12) United States Patent
Tsai et al.

(10) Patent No.: US 7,895,578 B2
(45) Date of Patent: Feb. 22, 2011

(54) APPARATUS AND METHOD FOR USING CONNECTOR COMPONENTS TO PROVIDE CONNECTIVITY TO INTERACTIVE GRAPHICS REPRESENTATIVE OF INPUT AND OUTPUT DATA

(75) Inventors: Shawn Tsai, San Diego, CA (US); Santiago E. Becerra, Jr., San Diego, CA (US)

(73) Assignee: Business Objects Software Ltd., Dublin (IE)

( * ) Notice: Subject to any disclaimer, the term of this patent is extended or adjusted under 35 U.S.C. 154(b) by 1153 days.

(21) Appl. No.: 11/450,143

(22) Filed: Jun. 9, 2006

(65) Prior Publication Data
US 2007/0006144 A1    Jan. 4, 2007

Related U.S. Application Data

(60) Provisional application No. 60/690,172, filed on Jun. 13, 2005.

(51) Int. Cl.
G06F 9/44 (2006.01)

(52) U.S. Cl. .................. 717/125; 717/105; 717/109; 717/113; 717/120; 715/760; 715/764; 715/771; 707/805

(58) Field of Classification Search ......... 717/103–106, 717/109, 113; 715/205, 234, 771, 764, 760, 715/204; 707/E17.013
See application file for complete search history.

(56) References Cited

U.S. PATENT DOCUMENTS

| | | | |
|---|---|---|---|
| 5,381,523 A * | 1/1995 | Hayashi ................. 715/204 |
| 5,386,568 A | 1/1995 | Wold et al. .............. 717/162 |
| 5,553,211 A * | 9/1996 | Uotani .................... 345/641 |
| 5,619,631 A | 4/1997 | Schott ..................... 345/440 |
| 5,630,125 A * | 5/1997 | Zellweger ..................... 1/1 |
| 5,640,557 A * | 6/1997 | McKiel, Jr. ..................... 1/1 |
| 5,721,848 A * | 2/1998 | Joseph .................... 715/764 |
| 5,727,161 A | 3/1998 | Purcell, Jr. et al. ........... 705/7 |
| 5,930,514 A * | 7/1999 | Thompson et al. ......... 717/170 |
| 5,999,729 A * | 12/1999 | Tabloski et al. ........... 717/105 |
| 6,011,553 A * | 1/2000 | Komiyama ............... 715/839 |
| 6,088,030 A * | 7/2000 | Bertram et al. ........... 715/839 |
| 6,154,875 A * | 11/2000 | Tanaka et al. ............. 717/107 |
| 6,181,342 B1* | 1/2001 | Niblack .................... 345/635 |
| 6,236,406 B1* | 5/2001 | Li ............................. 345/591 |
| 6,266,716 B1* | 7/2001 | Wilson et al. .............. 710/33 |
| 6,272,672 B1* | 8/2001 | Conway ................... 717/107 |
| 6,331,864 B1 | 12/2001 | Coco et al. ................ 715/763 |
| 6,400,996 B1* | 6/2002 | Hoffberg et al. ............ 700/83 |

(Continued)

OTHER PUBLICATIONS

Title: Creatiing GUIs for Web Services, author: Kassoff et al, source: IEEE, dated: Sep. 23, 2003.*

(Continued)

Primary Examiner—Chameli C Das
(74) Attorney, Agent, or Firm—Cooley LLP

(57) ABSTRACT

A computer readable medium includes executable instructions to allow the designation of a connector component provided within a Graphical User Interface (GUI). The selection of a graphic component within the GUI is supported. The connector component is associated with the graphic component. The connector component is associated with a data source. An interactive control panel incorporating the connector component and the graphic component is generated. The interactive control panel presents data from the data source.

22 Claims, 11 Drawing Sheets

U.S. PATENT DOCUMENTS

| | | | |
|---|---|---|---|
| 6,430,730 B1* | 8/2002 | Ghatate et al. | 716/4 |
| 6,434,737 B1* | 8/2002 | Nishi et al. | 717/105 |
| 6,449,643 B1* | 9/2002 | Hyndman et al. | 709/223 |
| 6,560,528 B1 | 5/2003 | Gitlin et al. | |
| 6,684,190 B1 | 1/2004 | Powers et al. | 705/4 |
| 6,834,276 B1* | 12/2004 | Jensen et al. | 1/1 |
| 6,904,408 B1 | 6/2005 | McCarthy et al. | |
| 6,993,504 B1 | 1/2006 | Friesen et al. | |
| 7,039,709 B1* | 5/2006 | Beadle et al. | 709/227 |
| 7,047,092 B2* | 5/2006 | Wimsatt | 700/83 |
| 7,093,005 B2* | 8/2006 | Patterson | 709/220 |
| 7,242,988 B1* | 7/2007 | Hoffberg et al. | 700/28 |
| 7,421,648 B1* | 9/2008 | Davis | 715/234 |
| 7,512,906 B1* | 3/2009 | Baier et al. | 715/866 |
| 7,650,355 B1* | 1/2010 | Davis | 715/202 |
| 7,720,953 B2* | 5/2010 | Mateescu et al. | 709/223 |
| 2002/0084974 A1 | 7/2002 | Ohshima et al. | |
| 2002/0184610 A1* | 12/2002 | Chong et al. | 717/109 |
| 2003/0018661 A1 | 1/2003 | Darugar | |
| 2003/0154279 A1* | 8/2003 | Aziz | 709/225 |
| 2003/0158947 A1 | 8/2003 | Bloch et al. | 709/227 |
| 2004/0207659 A1* | 10/2004 | Goodman et al. | 345/762 |
| 2004/0260427 A1* | 12/2004 | Wimsatt | 700/275 |
| 2005/0014494 A1 | 1/2005 | Owen et al. | |
| 2005/0289137 A1 | 12/2005 | Wu et al. | |
| 2006/0004771 A1 | 1/2006 | Enenkiel et al. | |
| 2006/0031359 A1* | 2/2006 | Clegg et al. | 709/206 |
| 2006/0187048 A1 | 8/2006 | Curkendall et al. | |
| 2006/0236254 A1* | 10/2006 | Mateescu et al. | 715/762 |
| 2007/0002689 A1* | 1/2007 | Mateescu et al. | 367/73 |
| 2007/0083303 A1* | 4/2007 | O'Sullivan et al. | 701/29 |
| 2007/0180447 A1* | 8/2007 | Mazzaferri et al. | 718/1 |
| 2007/0239573 A1* | 10/2007 | Tien et al. | 705/35 |
| 2009/0248524 A1* | 10/2009 | Defoy et al. | 705/14.1 |

OTHER PUBLICATIONS

Title: A form-based approach for Web services by end-user-initiative application development, author: Chusho et al, source: IEEE, dated: Aug. 7, 2002.*

Amazon, Amazon Fulfillment Web Service Developer Guide (Version 1.0) downloaded Jan. 5, 2010 http://docs.amazonwebservices.com/AWSFWS/1.0/DeveloperGuide/index.

W3C, Web Services Glossary, pp. 1-25 (Feb. 11, 2004) (downloaded Apr. 21, 2009) http://www.23.org/TR/ws-gloss/.

Webopedia, "What is a firewall? A Word definition from the Webopedia Computer Dictionary." (Aug. 26, 2004) dowloaded Apr. 22, 2009 www.webopedia.com/TERM/f/firewall.html.

PCT US2008/54158, Business Objects Software Ltd. International Search Report (Jul. 22, 2008).

* cited by examiner

APPARATUS AND METHOD FOR USING CONNECTOR COMPONENTS TO PROVIDE CONNECTIVITY TO INTERACTIVE GRAPHICS REPRESENTATIVE OF INPUT AND OUTPUT DATA

CROSS-REFERENCE TO RELATED APPLICATION

This application claims the benefit of U.S. Provisional Application No. 60/690,172, filed Jun. 13, 2005, entitled "Method for Creating Interactive and Connected Documents from within a High-level Point and Click Authoring Environment," the contents of which are incorporated herein by reference.

This application is related to the application entitled "Method and System for Creating Graphical and Interactive Representations of Input and Output Data", U.S. Ser. No. 10/153,400, filed May 21, 2002.

BRIEF DESCRIPTION OF THE INVENTION

This invention relates generally to creating and using dynamic and interactive graphics representative of input and output data. More particularly, this invention relates to using a connector component to integrate live data feeds, such as web services, within an interactive control panel that can be provided in distributable digital document formats, such as the Portable Document Format (PDF).

BACKGROUND OF THE INVENTION

A wide range of software tools that enable users to create different kinds of electronic documents are known in the prior art. These software tools vary greatly in terms of complexity as well as skill sets required for their use. Word processors such as Microsoft® Word™ allow users to create documents that combine text with images and allow for numerous fonts and layout options without requiring that the user be skilled with a programming language.

There are other tools that allow programmers to create software applications and programs, and these tools have traditionally been targeted at a very technical audience. In most cases these tools require knowledge of one or more programming languages and can only be used by a technical person who has much more specialized software engineering skills. Products such as Microsoft Developer Studio™ and Macromedia Flash MX 2004 Professional™ are examples of such tools used to create software applications and programs that provide access to web services and similar data sources. Typically, the applications created using such tools are delivered as web sites, or applications that end users must download and install on their computers.

In spite of the ubiquity of the Web, and the concept of an installable computer application, a significant volume of information is disseminated and exchanged through electronic documents. Electronic documents are much more transportable than computer applications, and they also can be viewed without being connected to the internet, or logged into a corporate network. Because of this, it is advantageous to support electronic document creation, dissemination and viewing.

In spite of the advances in document creation tools, there still exists a gap between the content that can be created by software developer tools and the content that can be created by document creation tools. This is the case not only in terms of the level of interactivity and connectivity of the content, but also by the skill set required to create such interactivity and connectivity within the content.

In view of the foregoing, it would be desirable to provide improved techniques for enabling a user without programming skills to create a document that combines interactive graphical components and connector components in an interactive control panel. Further, it would be advantageous to support exporting the interactive control panel that combines interactive graphical and connector components to a range of distributable digital document formats.

SUMMARY OF THE INVENTION

The invention includes a computer readable medium with executable instructions to allow the designation of a connector component provided within a Graphical User Interface (GUI). The selection of a graphic component within the GUI is supported. The connector component is associated with the graphic component. The connector component is associated with a data source. An interactive control panel incorporating the connector component and the graphic component is generated. The interactive control panel presents data from the data source.

The invention also includes a computer implemented method comprising adding a connector component to a design canvas, adding a graphic component to a design canvas, associating the connector component with the graphic component, and associating the connector component with a data source. An interactive control panel incorporating the connector data and the graphic component is generated. The interactive control panel presents data from the data source.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
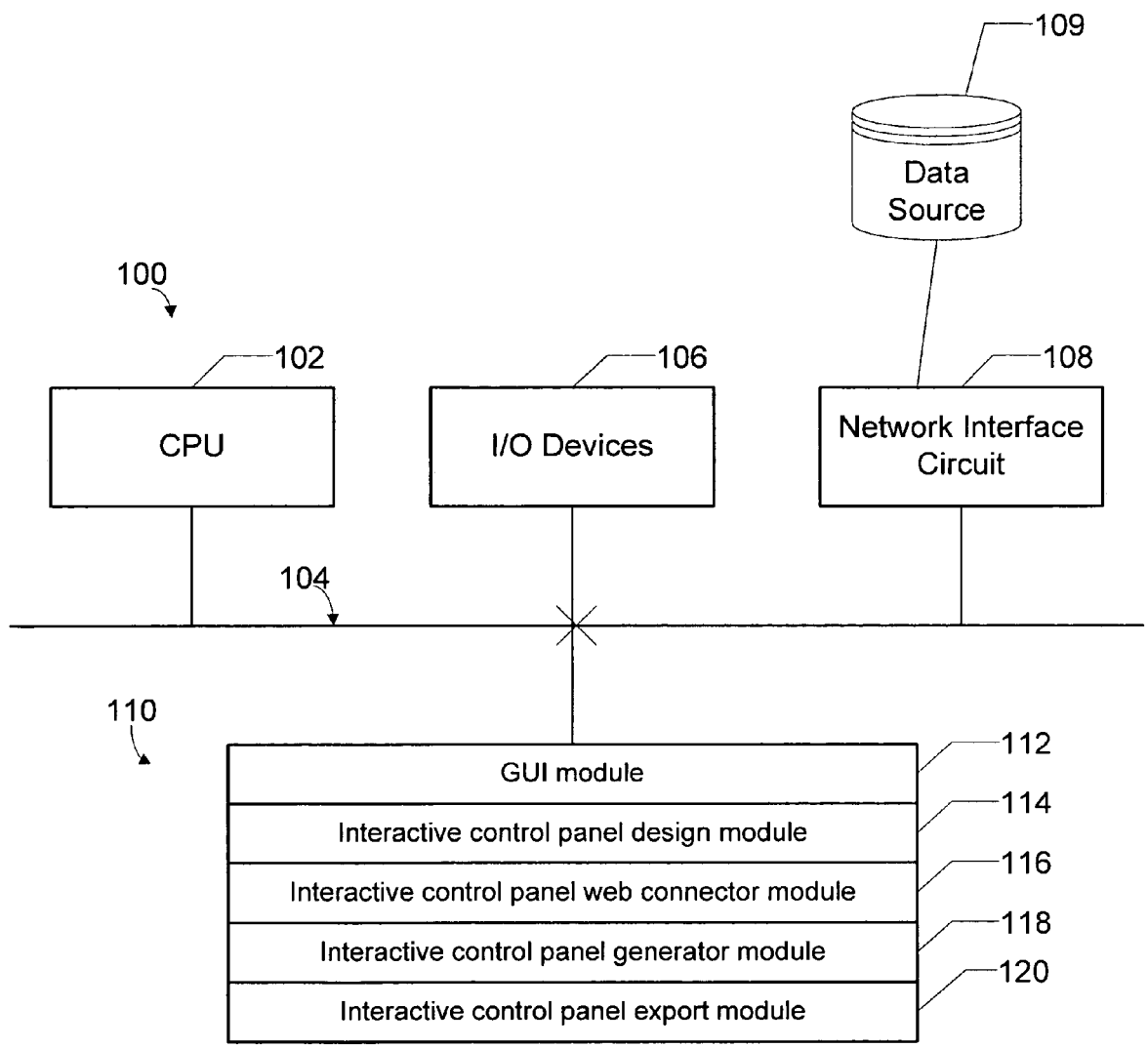
FIG. 1 a computer configured in accordance with an embodiment of the invention.

The following terminology is used while disclosing embodiments of the invention:

Canvas is the term for a graphical user interface (GUI) workspace in which a user (e.g., designer) selects graphical components and associates the graphic components with data values. The canvas can be saved as a working file or be used to generate an interactive control panel that represents the canvas.

Graphic Component is the term for a graphical element such as a chart (e.g., line, pie, column, bar, combination, bubble, XY, area, radar and the like), single value representation (e.g., dial, slider, progress bar, gauge, value, spinner, play button and the like), or selector (e.g., combo box, list box, label based menu, radio button, fish-eye menu, sliding picture menu, table, ticker, check box, icon, toggle button, filter, list builder, accordion menu, geographic map, collaboration element, calendar, text box and the like). These graphical components are typically predefined and are provided to the user who can modify aspects of the graphic component and associate the graphic component with data values including data values supplied by a connector component.

Connector Component is the term for a graphical element that represents a logical link between a graphic component and a data source or data model (e.g. a web service, Extensible Markup Language (XML) map, Microsoft Live Office™ document, Microsoft Reporting Services™, and the like). Although connector components are represented by graphical elements, properties can be set to hide the connector component in the generated interactive control panel. These connector components are typically predefined and are provided to the user who can modify aspects of the connector component, define the specific source connections, and associate the connector component with specific input and output data for the data connection.

Data values are data items that are associated with the connector components and graphic components. These values may represent discrete values, ranges, strings, calculated values and the like. The data may be based on a separate application document such as a Microsoft Excel™ document or another data source such as a database, web service, RSS feed and the like. A connector component is used to facilitate using certain data sources to provide data values.

Interactive Control Panel is the interactive form of the canvas that is generated from the canvas. In one embodiment of the invention, the interactive control panel is generated as a Macromedia Flash™ file (.swf) that is executable as a standalone application or as a plug-in program that is available on a variety of platforms for a variety of web browsers. An interactive control panel can be understood as interactive graphics representative of input and output data.

Exported Interactive Control Panel Distributable Digital Document is an exported version of the interactive control panel that is provided in a format such as Microsoft Word™, Microsoft Excel™, Microsoft PowerPoint™, Adobe Acrobat™ PDF. Depending, on the options set, security permissions, and the availability of a connection, the exported interactive control panel distributable digital document may or may not maintain its connectivity to the data source.

Designer User describes the user who creates a canvas by selecting graphic components and connector components, positioning graphic components on a canvas, optionally modifying aspects of the graphic and connector component, and associating the graphic component and connector component with data values.

End User describes the user who views the interactive control panel. The end user and designer user may be the same user.

A Programming Language is a set of semantic and syntactic rules to control the behavior of a machine. A programming language such as JSP, ASP,C#, VB.NET, Java JAVA®, or HTML/DHTML does not have to be written by an end user to work with the connector components or to set connector component properties associated with the invention.

Web service is typically comprised of a set of methods that can be invoked, typically by a developer writing custom code in a programming language. Each method contains a set of input and output parameters. The web service contains a Web Services Description Language (WSDL), which may be an XML file that fully describes a web service's methods, input, and output parameters. Web services can be hosted locally or remotely.

SOAP (Simple Object Access Protocol) based messages are used when communicating with a web service. SOAP is a standard protocol that is based on XML.

FIG. 1 illustrates a computer 100 configured in accordance with an embodiment of the invention. The computer 100 has standard components including a central processing unit 102, a bus 104, input/output devices 106, and an optional network interface circuit 108. The input/output devices 106 may include devices such as a keyboard, mouse, a display, such as monitor and the like.

The optional network interface circuit 108 facilitates communications with networked computers (not shown) and data sources 109. Data sources include databases, warehouses, web service providers, RSS (Rich Site Summary) feed providers, and the like. The computer 100 also includes a memory 110. The memory 110 includes executable instructions to implement operations of the invention.

In the example of FIG. 1, the memory 110 includes a GUI module 112 to facilitate the display of graphics and an interactive control panel design module 114 to facilitate the design of interactive control panels using predefined graphic components and connector components that can be associated with each other, with a data source, with a data value and the like. The memory 110 also stores an interactive control panel web connector module 116 to facilitate building connections between connector components and the data sources that they represent. An interactive control panel generator module 118 is stored in memory 110 to facilitate generation of interactive control panel files from the design module. An interactive control panel export module 120 within memory 110 facilitates the exportation of interactive control panel files to distributable digital document formats.

For the purposes of illustration, the components are shown on a single computer. Modules may be located on different computers, and interactive control panel files and distributable digital documents are designed to be distributed and viewed on multiple computers. It is the functions of the modules that are significant, not where they are performed or the specific manner in which they are performed.

Figure 2:
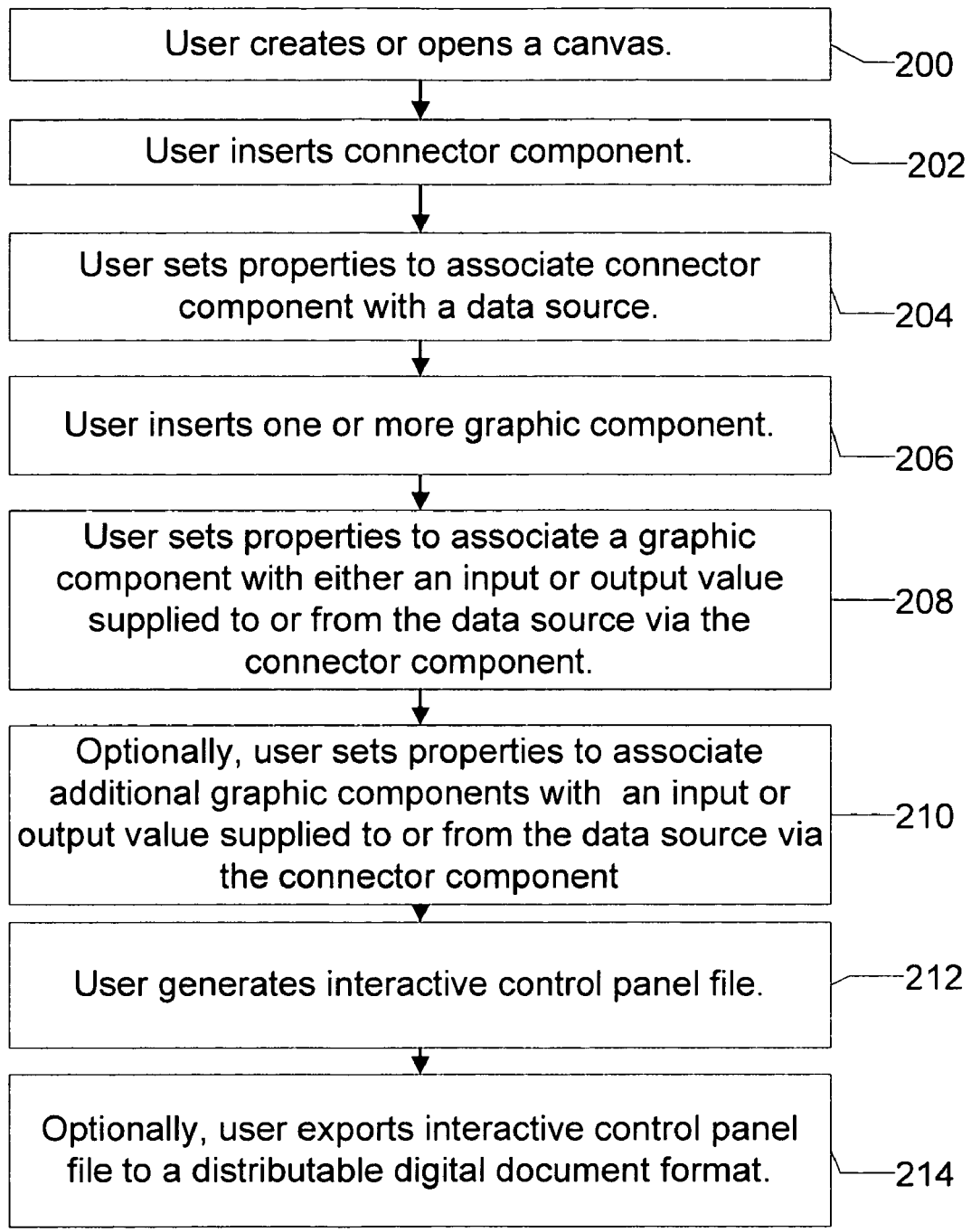
FIG. 2 illustrates a workflow for using connector components in accordance with an embodiment of the invention.

FIG. 2 illustrates the workflow for an embodiment of the invention. The user creates or opens an existing canvas 200. In one embodiment of the invention, the canvas is associated with a second file that provides a data model. In one embodiment, the second file is a Microsoft Excel™ file. The user inserts a connector component 202. A connector component is typically predefined and is provided to the designer who can modify aspects of the connector component and associate the connector component with graphic components within the canvas. In one embodiment, the connector components include connectors for a web service, XML map, Microsoft Live Office™ document, Microsoft Reporting Service™, and the like. The user uses the GUI to set properties to associate the connector component with a specific data source 204. This setting of properties is simply entering values in a simple GUI and does not require the user to understand a programming language. The user inserts one or more graphic components 206. These graphic components are typically predefined and are provided to the designer who can modify aspects of a graphic component and associate the graphic component with data values including data values supplied by connector components. The user associates one or more graphic components with an input or output value for the data source specified by a connector component 208. In one embodiment of the invention, the binding between graphic components and connector components is defined by associations in a second file. Optionally, the user may set properties to associate another graphic component with an input or output value supplied to or from a data source by a connector component 210.

A simple example where graphic components represent input and output values is a stock price interactive control panel. In this example, a text box enables a user to supply a value for a stock ticker symbol using a text box that supplies this value to a connector as an input value. The connector passes the value that is supplied in the graphic component to the data source defined by the connector component. Based on this supplied value, the data source passes a value to the connector component. The connector component can be associated with another graphic component such as a text box or graph to display the returned value using that graphic component. In this way, based on the stock ticker symbol entered by the user, the current stock price (or other values related to the specified stock ticker symbol) will be displayed.

There is no requirement that both an input value and an output value be specified using a connector component. For example, a data source may supply a value without requiring an input parameter. This occurs when the return value is not dependent on an input parameter. For example, a data source may return only the current temperature in San Diego. Likewise, there is no requirement that a data source return a value. A user can be provided with graphic components to supply values to a data source where the inputs via graphic components act as a form, and the data is passed to the data source, but there is no value returned from the data source.

The user may add any number of graphic components and connector components to enhance the interactive control panel and add any other desired functionality such as additional inputs, slider projections, alternate chart visualizations, and the like. When the user has completed designing the control panel, the user generates the interactive control panel file 212. Optionally, the user may specify preferences for aspects of the generated interactive control panel file. Optionally, the user then exports the interactive control panel file to a distributable digital document format 214. In one embodiment, the user may specify preferences for aspects of the distributable digital document file. In one embodiment of the invention, generating the interactive control panel file 212 and generating the distributable digital document 214 are combined in one selection.

Figure 3:
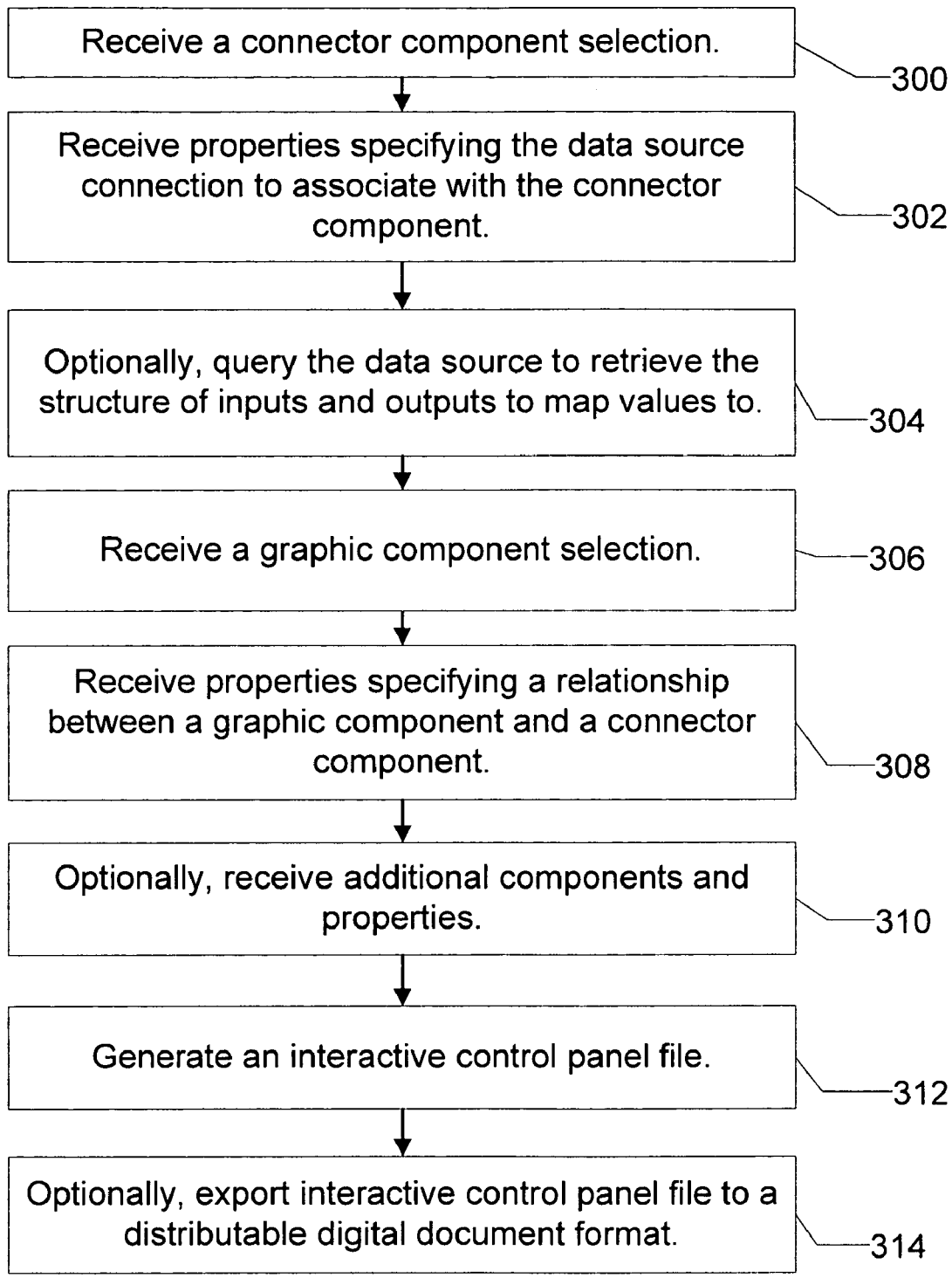
FIG. 3 illustrates a workflow for using connector components in accordance with an embodiment of the invention.

FIG. 3 illustrates a workflow associated with one embodiment of the invention. A connector component selection is received 300. Connector components specify the specific data connection type (such as a web service, XML map, Microsoft Live Office™ document, Microsoft Reporting Service™, and the like) and contain predefined logic for making connections to that type of data source. Properties are received that specify the data source connection to associate with the connector component 302. For example a web service provider such as http://www.webservicex.net/stockquote.asmx?WSDL or http://www.webservicex.net/uklocation.asmx?WSDL can be specified to provide stock quotes or United Kingdom postal codes, respectively. Similarly, a URL (Uniform Resource Locater), file, or server location for an XML map, Microsoft Live Office™ document or server, or Microsoft Reporting Services™ server can be provided. Optionally, the data source is queried to retrieve the structure of input parameters and output values to map values to 304. For example, a web service may accept a range of input values and may provide a range of output values. Retrieving this structure enables the designer to link to a specific input or output value when designing the interactive control panel file. Input values can include parameters used to calculate or select the output value, logon credentials and properties of the user environment such as operating system, date, time, and the like. In one embodiment of the invention, the user specifies the structure of the input parameters and output values rather than having a live query on the data source to return these values.

One or more graphic component selections are received 306. Properties specifying a relationship between a graphic component and a connector component are received 308. These properties are used to specify an input or output value of the connector component to associate with a graphic component. In one embodiment of the invention, the binding between graphic components and connector components is defined by associations in a second file. Optionally, additional components and properties are received 310. Based on the components, placement of components, properties defined for components, and relationships defined between components, an interactive control panel file is generated 312. Optionally, the interactive control panel file is exported in a distributable digital document format 314. In one embodiment, steps 312 and 314 are combined. The distributable digital document format may contain the interactive control panel file as an embedded file or may interpret the interactive control panel file and provide a representation of it within the distributable digital document.

Figure 4:
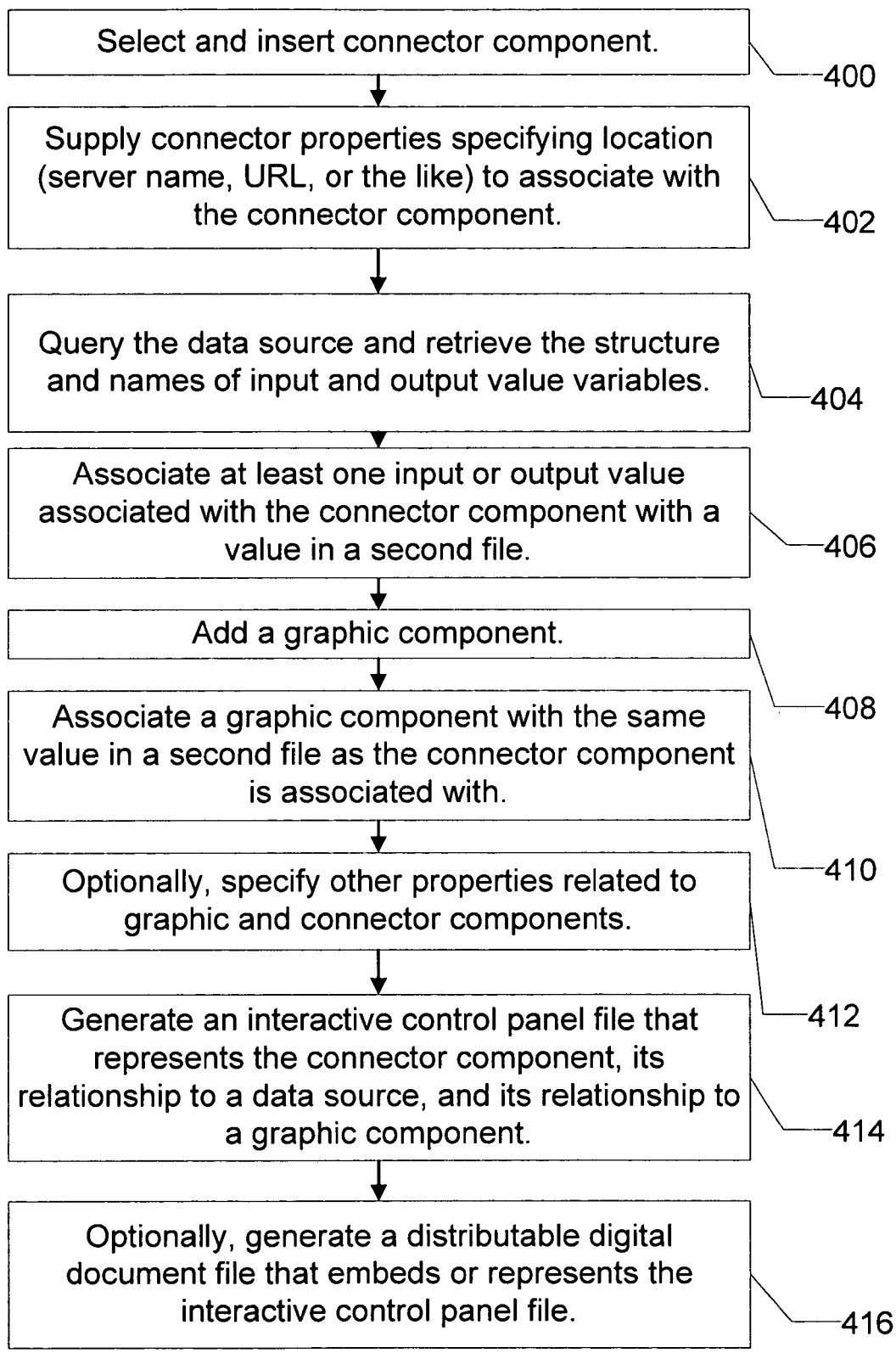
FIG. 4 illustrates a workflow for using connector components in accordance with an embodiment of the invention.

FIG. 4 illustrates a more detailed workflow for defining a connector component selection. A connector component is selected 400. The connector component includes logic for what properties are required to connect to a specific type of data source; the required and optional properties related to this specific type of data source are provided in the GUI. (See FIG. 7 for a GUI used to specify connector properties in one embodiment of the invention.) The connector properties specifying the location (server name, file name, URL or the like) to associate with the connector component are supplied 402. This information, in conjunction with other data source properties, provides the specific details that are required to pass values to and from the data source. Based on the properties specifying the specific location of the data source, the data source is queried and the structure and names for input and output value variables are retrieved 404.

At least one input or output value associated with the connector component is associated with a value in a second file 406. This value in a second file can be a single value or a range of values. This step is specific to one embodiment, and in other embodiments the input and output values associated with the connector component are bound directly to graphic component values. A graphic component 408 is then added. This component can be one of a wide range of visualizations for entering, returning, and modifying data values. The graphic component is associated with the same value in a second file as the connector component value is associated with 410. This value in a second file can be a single value or a range of values. In one embodiment, the value in the second file that is common to the connector component value and the graphic component value is a cell in a Microsoft Excel document. Optionally, other properties related to the graphic and connector components are specified 412. An interactive control panel that represents the canvas including the connector component, the connector component's relationship to a data source, and the connector components relationship to the graphic component is generated 414. The physical aspects of the canvas and layout of components are represented in the interactive control panel generated as are the underlying logical relationships represented by the component properties. Optionally, a distributable digital document is generated 416. This document embeds or represents the functionality of the interactive control panel and, dependent on network and security access, provides a live connection to the data source specified by the connector component.

Figure 5:
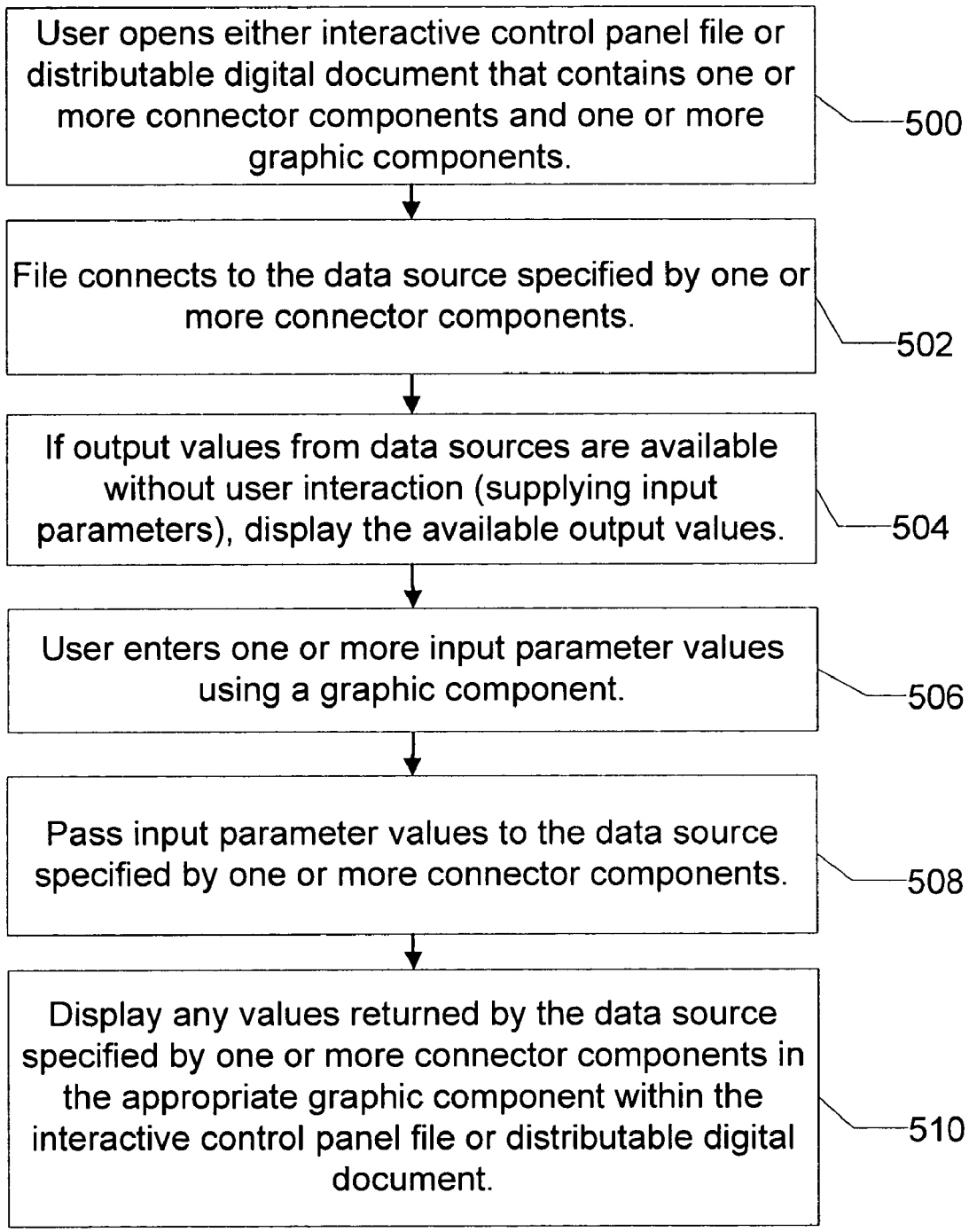
FIG. 5 illustrates a workflow for using connector components in accordance with an embodiment of the invention.

FIG. 5 illustrates a workflow for user interaction with an interactive control panel file or distributable digital document based on the interactive control panel where the interactive control panel contains one or more connector components and one or more graphical components. The user opens either an interactive control panel file or a distributable digital document with one or more connector components and one or more graphical components 500. The file connects to the data source specified by one or more connector components 502. The ability for the file to connect to the specified data source may be dependent on the availability of a network, logon criteria, or other security settings. In one embodiment of the invention, additional components may be provided and used to facilitate login to a remote server. If the output values from the data source are available without user interaction (supplying input parameters), the available output values 504 are displayed. These values will be displayed using the graphic components to which they are linked. Depending on the graphic component specified by the designer, this output can be provided in a number of formats such as text, chart, gauge, map, calendar and the like.

The user interacts with the file and enters one or more parameter values using a graphic component 506. Depending on the graphic component specified by the designer, this input can be provided using a range of graphic components. These graphic components may include text boxes, selectors such as radio buttons, check boxes, combo boxes and the like, gauges, sliders, dials and the like.

The input parameters supplied by the user are passed to the data source specified by one or more connector components 508. Depending on the graphic controls implemented, the user may click a button to submit the input value or the input value may automatically be passed when it is selected or entered. Depending on the design of the interactive control panel, calculations can be specified to modify or normalize the input values before passing them to the data source. There can be multiple connector components in one interactive control panel and logic can be used to combine the values such that a value returned by one connector component is passed as an input to a second connector component.

The final processing operation of FIG. 5 is to display any values returned by the data source specified by one or more connector components in the appropriate graphic component within the interactive control panel file or distributable digital document 510. There is no requirement that a value be returned by the data source; the interactive control panel file or distributable digital document can act as a form to gather values to pass to the data source without returning a value from the data source. This can be used for surveys, updating databases and servers, and the like.

The user can continue to interact with the interactive control panel file or distributable digital document file, specifying new values for the input parameters, using the returned values as initial values to supply input parameters to any components designed to provide projection values and scenarios and making use of any interactivity provided.

Figure 6:
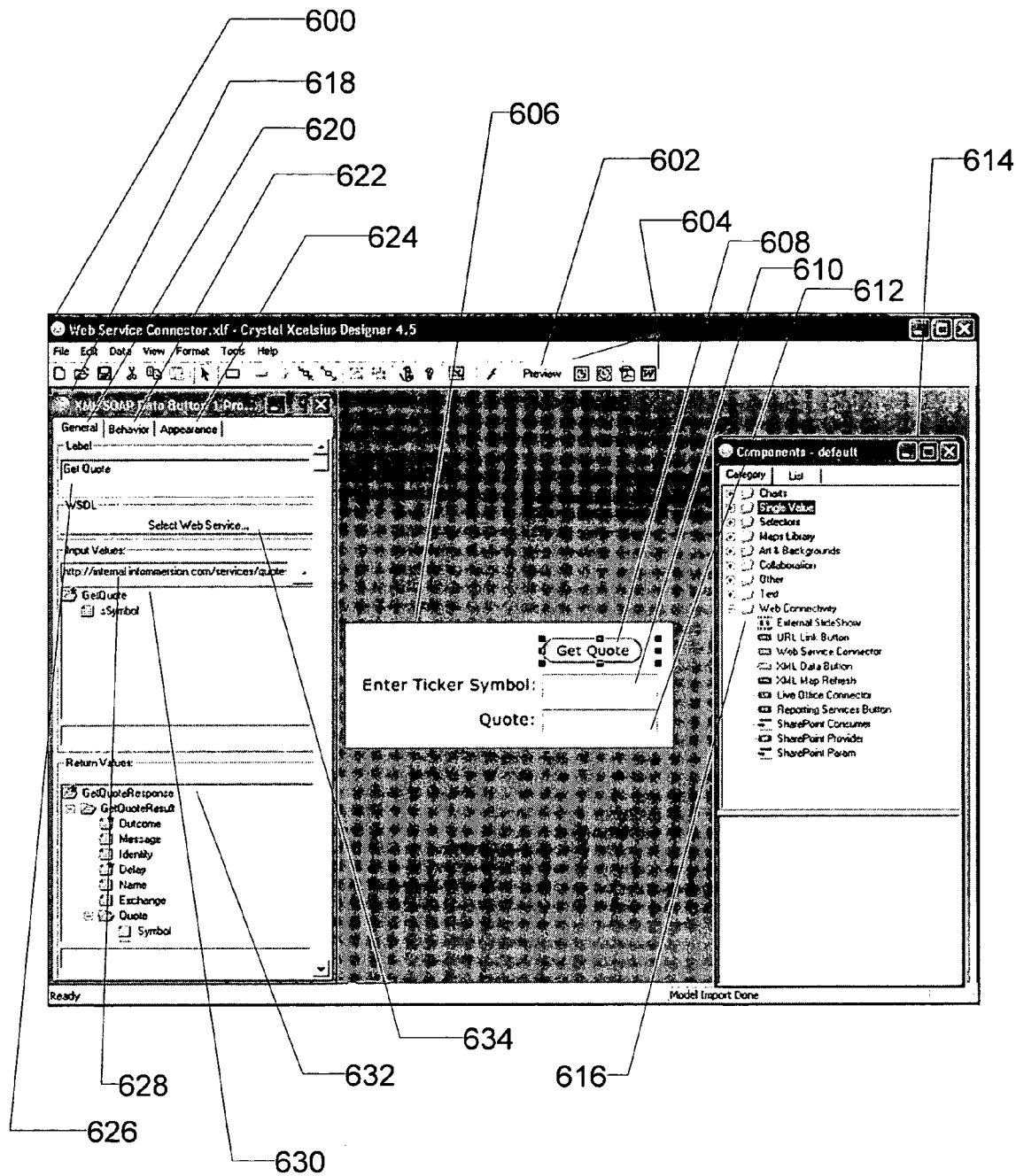
FIG. 6 illustrates an embodiment of a GUI associated with one aspect of the invention.

FIGS. 6-11 illustrate GUIs associated with an embodiment of the invention and with the workflow illustrated in FIG. 4. Referring to FIG. 6, within the overall interactive control panel designer 600, the user defines a canvas 606 by inserting components using the component control 614 that contains an extensive list of components including connector components 616. In this example, a web service connector component 608, an input value box component 610, and an output value box component 612 have been added to the canvas. The overall interactive control panel designer 600 contains a wide range of general functionality including a button representing a control to generate a preview interactive control panel 602 from the canvas 606, as well as buttons representing controls to export the canvas to a range of export file formats 604 including Microsoft PowerPoint, Microsoft Outlook email, Adobe PDF, and Microsoft Word.

Additionally, FIG. 6 illustrates a GUI control for setting properties related to a component on the canvas 618. In this case, the control enables setting properties associated with a web service component 608 that has been included on the canvas 606. There are three panels in the GUI for setting the connector properties: General 620, Behavior 622, and Appearance 624. On each of the tab panels, a range of values can be associated with the connector component to link the connector to a specific data source and structure, to control behaviors such as refresh, triggers, visibility, and load status, to control appearance and content for the control including transparency, text labels and the like. On the General tab, information such as the button label 626 and data source location 628 can be provided. The general tab also provides the values returned by querying the structure and content of the data source. After the data source has been queried, in the upper panel, potential input values are specified 630 and in the lower frame potential output values are specified 632. In this way, it is possible to map the specific input and output properties for the data source represented by the connector component. In order to query the data source and select the method to specify input and output values, the user clicks "Select Web Service" 634.

Figure 7:
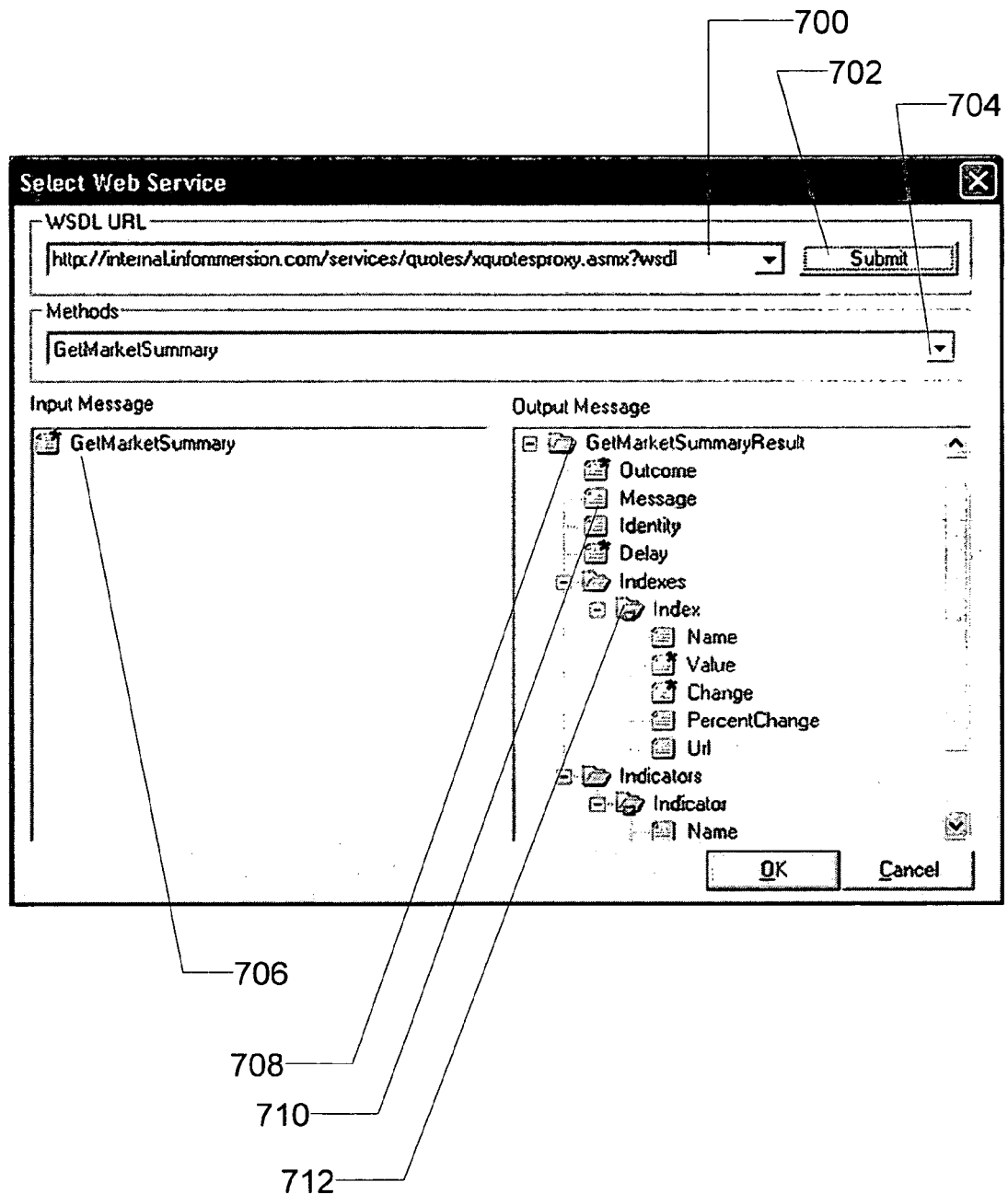
FIG. 7 illustrates an embodiment of a GUI associated with one aspect of the invention.

FIG. 7 illustrates a GUI associated with one embodiment of the invention that is used to specify the method associated with a web service and to retrieve the input and output values for a message associated with that method. In one embodiment, this GUI is displayed when a user activates "Select Web Service" 634 in FIG. 6. In FIG. 7, the GUI enables a user to enter a WSDL URL 700 and submit the WSDL URL 702 to validate the WSDL and return the methods and input and output values associated with a given method for a web service. The methods are retrieved and the user can use the drop down menu 704 to select a method for which input and output message values will be displayed.

The GUI in FIG. 6 and FIG. 7 also use a graphical tree structure and various GUI elements to assist the user in understanding the structure and content of the input and output messages. For example, folders are used to show logical groupings that hold elements 708 and arrows on folders 712 denote repeating elements where there can be more than one of these elements sent or returned in the message. Elements are indicated with a file icon 710 and required elements are indicated with an asterisk 706. Other icons are used to differentiate between elements and attributes. Mouseovers indicate data types associated with the input and output values.

Figure 8:
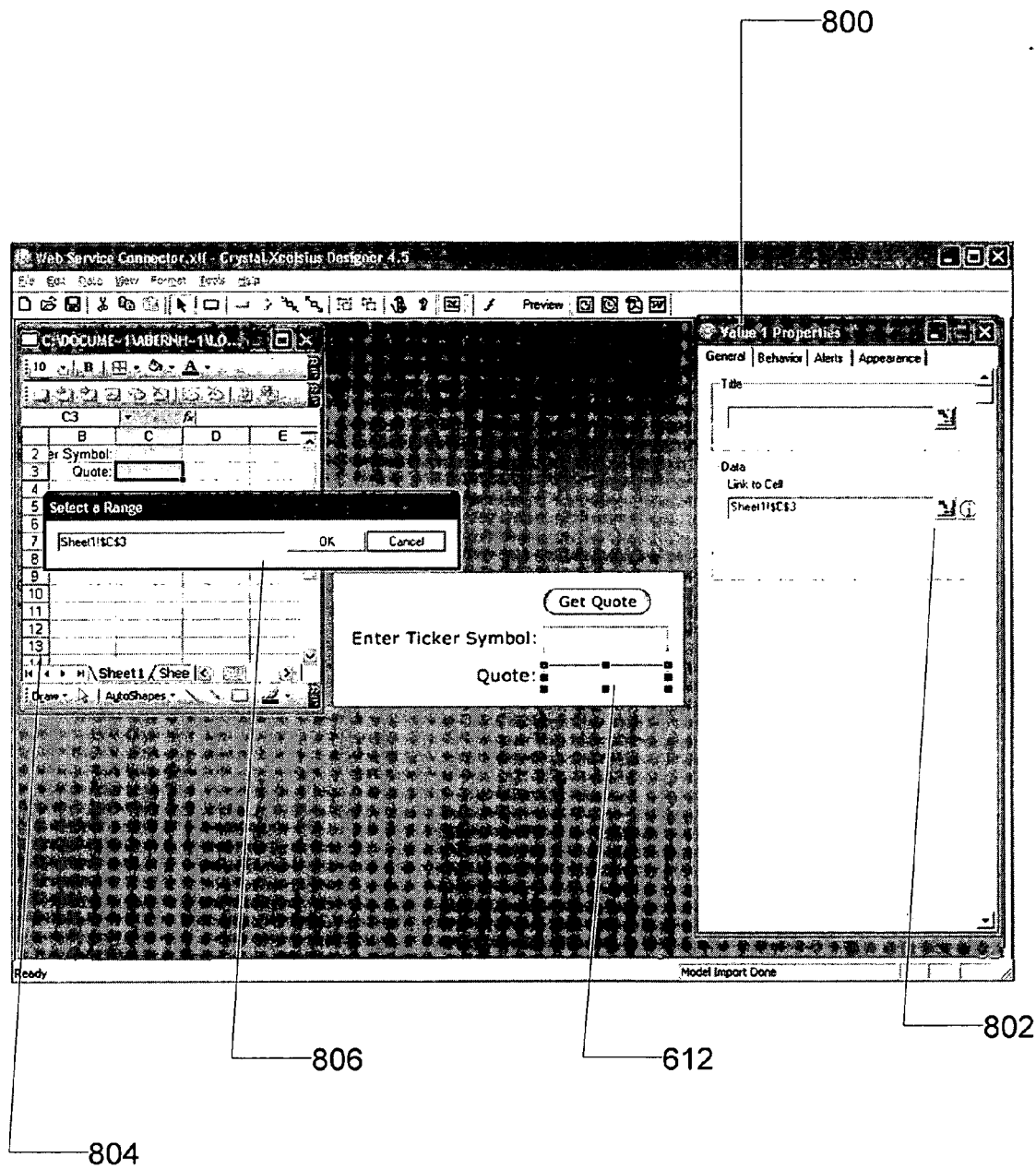
FIG. 8 illustrates an embodiment of a GUI associated with one aspect of the invention.

FIG. 8 illustrates the association of a graphic component 612 on the canvas to a second file 804 and an individual or range of values 806 in that second file. The user opens the property panel 800 for the graphic component 612 and selects a link to data 802. This selecting launches the second file 804 and enables the user to select the value or range of values 806 in the second file to associate with the graphic component. In a preferred embodiment, the second file has been associated with the canvas as providing a data model for the interaction between the components.

Figure 9:
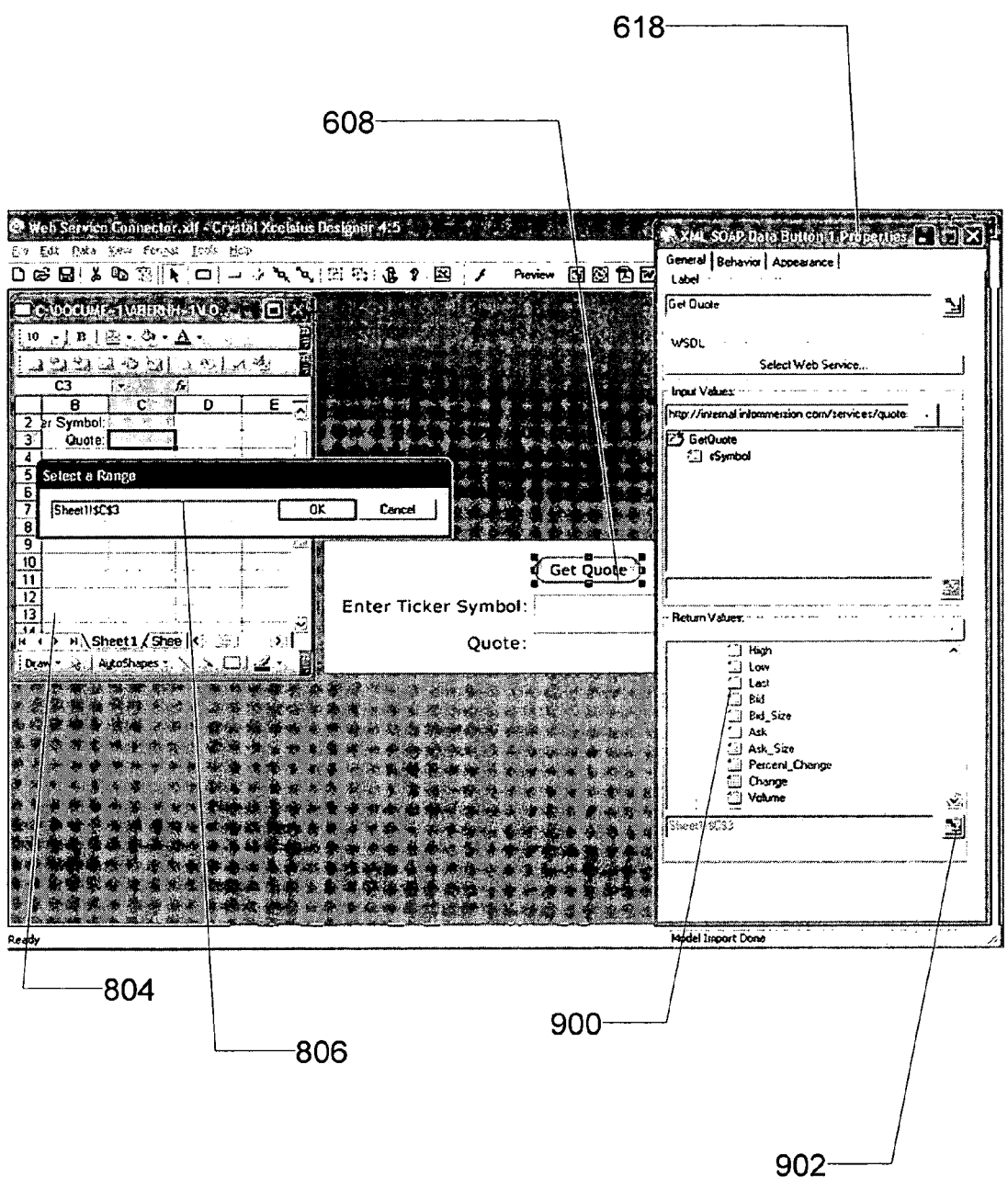
FIG. 9 illustrates an embodiment of a GUI associated with one aspect of the invention.

FIG. 9 illustrates the parallel association between the output value for a connector component and a graphic component where both components are linked to a second file and an individual or range of values in that second file. The user opens the property panel 618 for the connector component 608 and selects an output value 900. The user then makes a selection to link the output value to data 902. This selecting launches the second file 804 and enables the user to select the value or range of values 806 in the second file to associate with the graphic component. In one embodiment, the second file is associated with the canvas as a data model for the interaction between components. The same method is used whether an input value or output value is being selected and associated with a graphic component.

Figure 10:
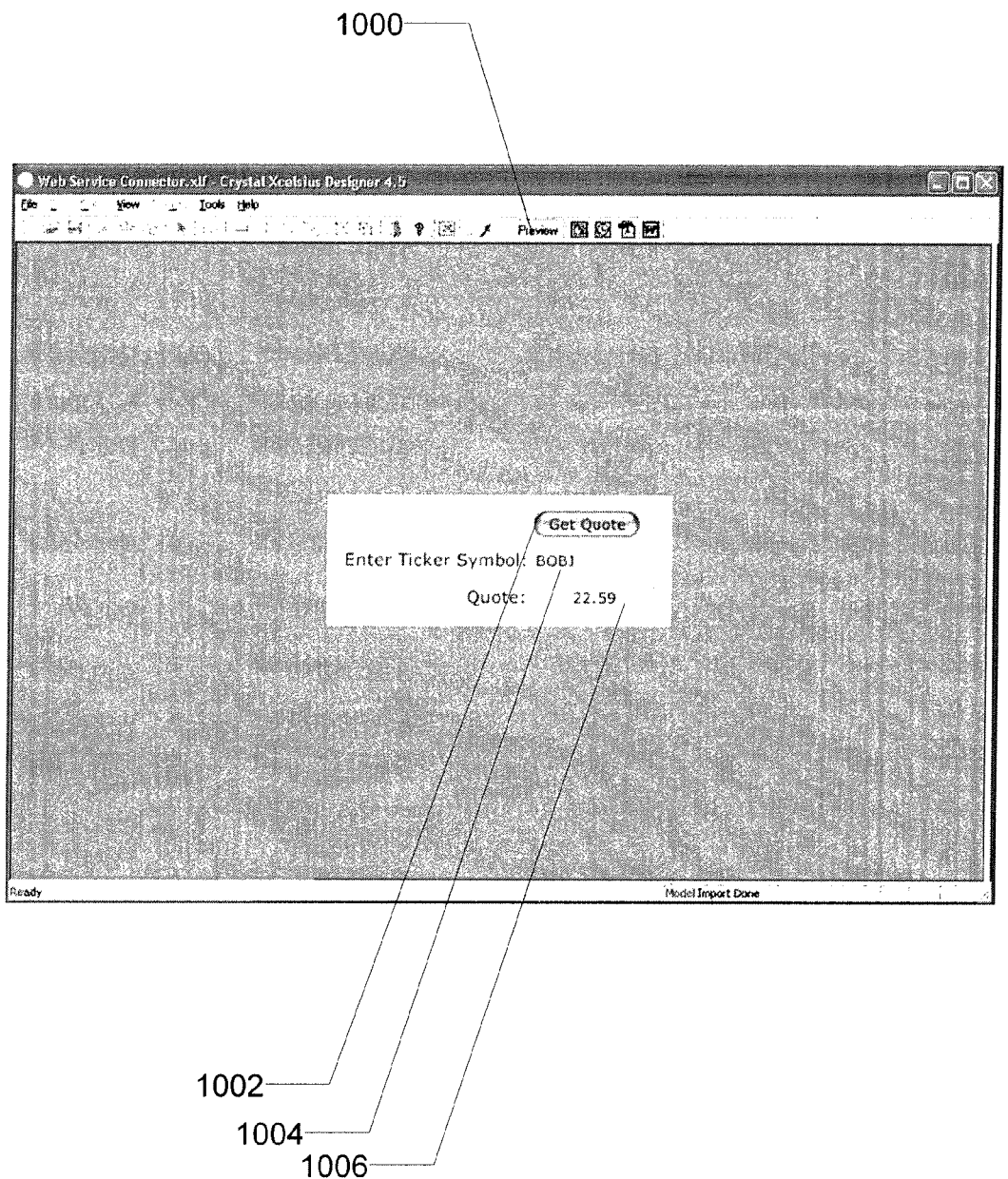
FIG. 10 illustrates an embodiment of a GUI associated with one aspect of the invention.

FIG. 10 illustrates an interactive control panel file where input and output values for a connector component have been defined and a user is able to specify a value for which a return value is provided by the data source. An interactive control panel file is generated from the canvas when the user selects the preview command 1000. The interactive control panel file includes a connector component functioning as a button 1002, a graphic component 1004 for user value input, and a graphic component 1006 for supplying values returned from the data source. The user enters an input value, in this case the stock ticker symbol for a stock. Selecting the connector component 1002 passes this user input value to the data source and the returned value, in this case a stock price, is returned and displayed. The user can then continue to modify the input value in graphic component 1004 and submit it using the connector 1002. The output value is modified in response to the input value. The interactive control panel file is distributable and can be used by different users than the user who designed the interactive control panel.

Figure 11:
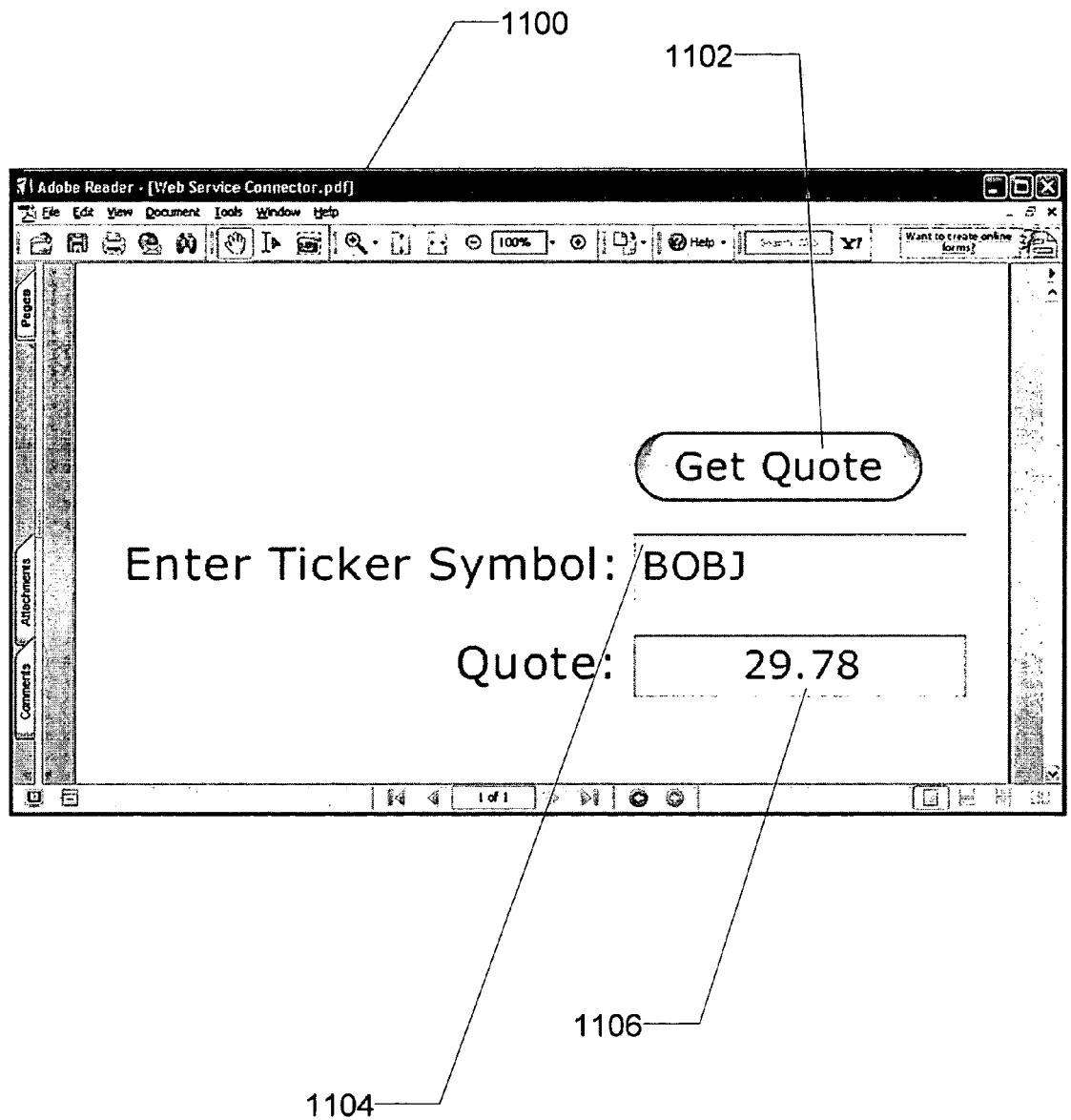
FIG. 11 illustrates an embodiment of a GUI associated with one aspect of the invention.

FIG. 11 illustrates a distributable digital document file based on an interactive control panel file where input and output values for a connector component have been defined and a user is able to specify a value for which a corresponding return value is provided by the data source. The distributable digital document is displayed in a viewer 1100 suitable for the export format. In this case, the document is displayed in Adobe Acrobat Reader. Within the distributable digital document file, the same components from the interactive control panel file are maintained. The connector component functions as a button 1102. The input field 1104 is provided for user input. The output field 1106 is provided to display a returned value. The same interactive capacity that was provided by the interactive control panel format is maintained in the distributable digital document format. The user enters a value in input field 1104, in this case the stock ticker symbol for a stock. Selecting the connector component 1102 passes this user input value to the data source. The returned value, in this case a stock price, is returned and displayed in field 1106. The user can then modify the input value in field 1104 and submit it using the connector 1102. As a result, the output value in field 1106 is modified.

The following code sample shows the code that generates a PDF document which embeds a flash file into it. The resulting PDF file retains interactive aspects of the original flash file including the ability to connect to external data sources. This code was written based on information contained in the Adobe PDF file format Specification.

In the sample code to create a PDF file with an embedded interactive SWF file, the PDF file is defined based on the conventions and structure of the PDF format. Of particular note is the definition of the PDF page level in lines 45-135. The page is defined based on the embedded SWF (interactive control panel file version). A crop box and media box are defined at lines 52-56 to contain the embedded content lines. Lines 129-134 define the specific SWF file to embed and properties associated with it. Code in lines 136-153 copies the specific bits from the SWF file into the PDF file.

```
1    //Code to generate a PDF file with an embedded interactive SWF file containing a connector
     component, such as a web service connector. Instructions to create a PDF file with the same name as an
     existing SWF file.
2    CPdf::Create(const char* swffile, const char* pdffile) {
3    //Variable declarations, and initial values set for variables. The string s is used to combine a set of
     instructions to specify the aspects of the PDF document that is being created.
4       string s;
5       int count = 0;
6       long index = 0;
7       long len;
8       vector<long> indexes;
9       of stream ofs(pdffile, ios: : binary) ;
10      ++count;
11      s = "%PDF-1.5\r";
12      index += s.size( );
13      ofs << s;
14      indexes.push_back(index);
15      ++count;
16      s = "1 0 obj";
17      s += "<<";
18      S += "/Type/Catalog";
19      s += "/Outlines 2 0 R";
20      s += "/pages 3 0 R";
21      s += ">>";
22      S += "\rendobj\r";
23      index += s.size( );
24      ofs << s;
25      indexes. push_back (index) ;
```

-continued

| | |
|---|---|
| 26 | ++count; |
| 27 | s = "2 0 obj"; |
| 28 | s += "<<"; |
| 29 | S += "/Type/Outlines"; |
| 30 | s += "/Count 0"; |
| 31 | s += ">>"; |
| 32 | S += "\rendobj\r"; |
| 33 | index += s.size( ); |
| 34 | ofs ' ' s; |
| 35 | indexes.push_back(index); |
| 36 | ++count; |
| 37 | s = "3 0 obj"; |
| 38 | s += "<<"; |
| 39 | S += "/Type/ Pages" ; |
| 40 | s += "/Kids[4 0 RI"; |
| 41 | s += "/Count 1"; |
| 42 | s+= ">>"; |
| 43 | S += "\rendobj\r"; |
| 44 | index += s.size( ); |
| 45 | ofs ' ' s; |
| 46 | //This is where page is defined to contain the media box that will contain the embedded SWF. The page content is defined based on the embedded SWF file. |
| 47 | indexes.push_back(index); |
| 48 | ++count; |
| 49 | s = "4 0 obj"; |
| 50 | s += "<<"; |
| 51 | S += "/Type/Page"; |
| 52 | s += "/CropBox[O.O 0.0 612.0 792.0]"; s += "/Annots 5 0 R"; |
| 53 | s += "/parent 3 0 R"; |
| 54 | s += "/StructParents 0"; |
| 55 | s += "!Rotate 0"; |
| 56 | s += "/MediaBox[O.O 0.0 612.0 792.01"; s += "/Resources"; |
| 57 | s += "<<"; |
| 58 | s += "/ProcSet[/PDF/Text]"; |
| 59 | s += "<<"; |
| 60 | s += ">>"; |
| 61 | s += "\rendobj\r"; |
| 62 | index += .size( ); |
| 63 | ofs "<<" s; |
| 64 | indexes.push_back(index); |
| 65 | ++count; |
| 66 | s = "5 0 obj"; |
| 67 | s += "[6 0 R]"; |
| 68 | s += "\rendobj\r"; |
| 69 | index += s.size( ); |
| 70 | ofs << s; |
| 71 | indexes.push_back(index); |
| 72 | ++count; |
| 73 | s = "6 O obj"; |
| 74 | s += "<<"; |
| 75 | s += "/Rect[O.O 0.0 612.0 792.0]/Subtype/Screen/BS<</S/W O/Type/Border>>/F 4/P 4 0 R/T(Annotation from <embedded content>)/Border[O 0 1]/Type/Annot/AA"/U 7 0 R/PI 8 0 R/PV 9 0 R"/MK<<>>"; |
| 76 | |
| 77 | s += ">>"; |
| 78 | s += "\rendobj\r"; |
| 79 | index += s.size( ); |
| 80 | ofs ' ' s; |
| 81 | indexes.push_back(index); |
| 82 | ++count; |
| 83 | s = "7 0 obj"; |
| 84 | s += "<<"; |
| 85 | s += "/OP O/R 10 0 R/S/Rendition/AN 6 0 R"; |
| 86 | s+=>>""; |
| 87 | s += "\rendobj\r"; |
| 88 | index += s.size( ); |
| 89 | ofs << s; |
| 90 | indexes.push_back(index); |
| 91 | ++count; |
| 92 | s = "8 0 obj"; |
| 93 | s += "<<"; |
| 94 | s += "/OP 2/R 10 0 R/S/Rendition/AN 6 0 R"; |
| 95 | s += ">>"; |
| 96 | s += "\rendobj\r"; |
| 97 | index += s.size( ); |
| 98 | ofs << s; |
| 99 | indexes.push_back(index); |
| 100 | ++count; |
| 101 | s = "9 0 obj"; |
| 102 | s += "<<"; |

-continued

```
103    s += "/OP 4/R 10 0 R/S/Rendition/AN 6 0 R";
104    s += ">>";
105    S += "\rendobj\r";
106    index += s.size( );
107    ofs << s;
108    indexes.push_back(index);
109    ++count;
110    s = "10 0 obj";
111    s += "<<";
112    s += "/C 11 0 R/N(Rendition from <embedded content"/S/MR";
113    s += ">>";
114    S += "\rendobj\r";
115    index += s.size( );
116    ofs << s;
117    indexes.push_back(index);
118    ++count;
119    s = "11 0 obj";
120    s += "<<";
121    s += "/D 12 0 R/CT/(application/x-shockwave-flash)/N(Media clip from <embedded
       content>)/P<</TF(TEMPACCESS)>>/S/MCD";
122    s += ">>";
123    s += "\rendobj\r";
124    index += s.size( );
125    ofs '' s;
126    indexes.push_back(index) ;
127    ++count;
128    s = "12 0 obj";
129    s += "<<";
130    s += "/F(test.swf)/EF"/F 13 0 R"/Type/Filespec";
131    s += ">>";
132    s += "\rendobj\r";
133    index += s.size( );
134    ofs << s;
135    //Code in lines 136–153 copy bits from the original SWF file into the PDF.
136    ifstream ifs(swffile, ios: : binary);
137    ifs.seekg(O, ios_base: :beg);
138    fstream::pos-type begin-pos = ifs.tellg( );
139    ifs.seekg(O, ios_base: :end);
140    len = (ifs.tellg( ) – begin-pos);
141    ifs.seekg(O, ios_base::beg);
142    indexes.push_back(index) ;
143    ++count;
144    begin-pos = ofs.tellp( ) ;
145    ofs << "13 0 obj";
146    ofs << "<<";
147    ofs << "/Subtype1application#2Fx-shockwave-flash";
148    ofs << "/Length " << len;
149    ofs << ">>";
150    ofs << "stream\n";
151    for (int i=O; i<len; ++i) char c; ifs.read(&c, 1); ofs.write(&c, 1);
152    }
153    ifs.close( ) ;
154    ofs " "\nendstream";
155    ofs " "\rendobj\r";
156    index += (ofs.tellp( ) – begin-pos);
157    // start xref
158    ofs << "xref\n";
159    ofs << "0" << count << "\n";
160    ofs << "0000000000 65535 f\n";
161    vector<long>::iterator it = indexes.begin( );
162    for (; it != indexes.end( ); ++it) (
163    ofs.width(10) ;
164    ofs. fill ( '0' ) ;
165    ofs '' (*it) << " 00000 n\n";
166    //trailer
167    ofs << "trailer\n";
168    ofs << "<<";
169    ofs << "/Size " <<count;
170    ofs << "/Root 1 0 R";
171    ofs << ">>";
172    //startxref
173    ofs << "\nstartxref\n";
174    ofs << index << \nt;
175    ofs << "%%EOF";
176    ofs. close ( ) ;
```

The techniques of the invention may be used to establish various interactions between graphic objects and connector components. For example, a user can supply a value to graphic component A, pass the value from graphic component A to connector component B, pass the value from connector component B as an input to connector component C, and display the value from connector component C in graphic component D. Consider another scenario in which a user supplies a value to graphic component A and a different value to graphic component B. Then, graphic component A and graphic component B pass their values to connector component C. Consider another case in which a user supplies a value to graphic component A and the value is passed to another graphic component B, which performs a calculation on the value. The revised value is then passed to connector component C.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java JAVA®, C#, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium, comprising executable instructions to:
    allow the designation of a connector component provided within a Graphical User Interface (GUI), wherein the connector component is associated with a data source;
    support a selection of an input field and an output field within the GUI;
    associate the connector component, the input field and the output field;
    generate an interactive control panel incorporating the connector component, the input field and the output field, wherein the interactive control panel is a standalone application or plug-in program with interactive graphics that represent input and output data;
    receive user input at the input field; and
    recognize a selection of the connector component to initiate access to the data Source, such that the data source returns to the output field a value corresponding to the user input.

2. The computer readable storage medium of claim 1 further comprising executable instructions to generate a distributable digital document file incorporating the interactive control panel.

3. The computer readable storage medium of claim 1 further comprising executable instructions to associate the connector component with a web service with a Web Services Description Language characterizing the web service methods, input parameters and output parameters.

4. The computer readable storage medium of claim 1 further comprising executable instructions to associate the connector component with one of:
    an Extensible Markup Language (XML) map, a Microsoft Live Office™ document and a Microsoft Reporting Service™.

5. The computer readable storage medium of claim 1 further comprising executable instructions to allow the connector component to query input and output values associated with the data source.

6. The computer readable storage medium of claim 1 further comprising executable instructions to allow the connector component to provide a live connection to the data source.

7. The computer readable storage medium of claim 6 further comprising executable instructions to supply an input value to the data source using the live connection to the data source.

8. The computer readable storage medium of claim 7 further comprising executable instructions to supply an output value from the data source in response to the input value.

9. The computer readable storage medium of claim 6 further comprising executable instructions to supply an output value from the data source using the live connection to the data source.

10. The computer readable storage medium of claim 1 further comprising executable instructions to allow the connector component to query input and output values associated with the data source.

11. The computer readable storage medium of claim 1 further comprising executable instructions to provide a live connection to the data source through a distributable digital document.

12. The computer readable storage medium of claim 11 wherein an input value is supplied to the data source using the live connection to the data source in the distributable digital document.

13. The computer readable storage medium of claim 12 wherein an output value is supplied from the data source using the live connection to the data source based on the value supplied as the input value in the distributable digital document.

14. The computer readable storage medium of claim 11 wherein an output value is supplied from the data source using the live connection to the data source in the distributable digital document.

15. A computer implemented method, comprising:

adding a connector component to a design canvas, wherein the connector component is associated with a data source;

adding a an input field and an output field to the design canvas;

associating the connector component, the input field and the output field;

generating an interactive control panel incorporating the connector component, the input field and the output field, wherein the interactive control panel is a standalone application or plug-in program with interactive graphics that represent input and output data;

receiving user input at the input field; and recognizing a selection of the connector component that initiates access to the data source, such that the data source returns to the output field a value corresponding to the user input.

16. The computer implemented method of claim 15 further comprising generating a distributable digital document file incorporating the interactive control panel.

17. The computer implemented method of claim 15 further comprising associating the connector component with a web service with a Web Services Description Language characterizing the web service methods, input parameters and output parameters.

18. The computer implemented method of claim 15 further comprising associating the connector component with at least one additional connector graphic component.

19. The computer implemented method of claim 18 further comprising passing a value from the connector component to at least one additional connector graphic component.

20. The computer implemented method of claim 15 further comprising associating more than one graphical component with a connector component.

21. The computer implemented method of claim 20 further comprising passing values from more than one graphic component to a connector.

22. The computer implemented method of claim 15 further comprising performing calculations on an input value to produce a revised input value and supplying the revised input value to a live connection.

* * * * *